United States Patent
Lim et al.

(10) Patent No.: US 11,876,413 B2
(45) Date of Patent: Jan. 16, 2024

(54) HYBRID INDUCTION MOTOR INCLUDING DUAL STATOR

(71) Applicants: HYUNDAI MOTOR COMPANY, Seoul (KR); Kia Corporation, Seoul (KR); IUCF-HYU (Industry-University Cooperation Foundation Hanyang University), Seoul (KR)

(72) Inventors: Myung Seop Lim, Seoul (KR); Jae Hyun Kim, Seoul (KR); Sung Woo Hwang, Seoul (KR); Jin Cheol Park, Seoul (KR); Jin Ho Choi, Suwon-si (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 63 days.

(21) Appl. No.: 17/675,333

(22) Filed: Feb. 18, 2022

(65) Prior Publication Data

US 2023/0024385 A1 Jan. 26, 2023

(30) Foreign Application Priority Data

Jul. 14, 2021 (KR) .......................... 10-2021-0092185

(51) Int. Cl.
*H02K 17/12* (2006.01)
*H02K 1/16* (2006.01)
*H02K 11/33* (2016.01)

(52) U.S. Cl.
CPC ............... *H02K 17/12* (2013.01); *H02K 1/16* (2013.01); *H02K 11/33* (2016.01)

(58) Field of Classification Search
CPC .... B62D 21/15; B62D 25/105; B62D 29/043; H02K 1/16; H02K 11/33; H02K 16/04; H02K 17/12; H02K 17/165; Y02T 10/64
See application file for complete search history.

(56) References Cited

FOREIGN PATENT DOCUMENTS

CN 111509938 B * 12/2021 ............... H02K 1/17
EP 0913914 A1 * 6/1999
(Continued)

OTHER PUBLICATIONS

WO-2016051250-A2, Igarishi, all pages (Year: 2016).*
(Continued)

*Primary Examiner* — Naishadh N Desai
(74) *Attorney, Agent, or Firm* — Morgan, Lewis & Bockius LLP

(57) ABSTRACT

The present disclosure in some embodiment provides a hybrid induction motor including dual stators. According to at least one embodiment, the present disclosure provides a hybrid induction motor including a hollow rotor including a single conductor bar which is annularly disposed and spaced apart from a rotation axis by a predetermined distance, an outer stator having an outer stator winding disposed in parallel with an outer circumferential surface of the hollow rotor, and an inner stator having an inner stator winding disposed in parallel with an inner circumferential surface of the hollow rotor.

8 Claims, 7 Drawing Sheets

(56) References Cited

FOREIGN PATENT DOCUMENTS

| JP | 4868290 B2 | 2/2012 | |
|---|---|---|---|
| JP | 5796613 B2 | 10/2015 | |
| JP | 2016192879 A * | 11/2016 | ............. H02K 16/04 |
| WO | WO-2014016305 A2 * | 1/2014 | ........... H02K 11/215 |
| WO | WO-2016051250 A2 * | 4/2016 | ............... H02K 1/14 |

OTHER PUBLICATIONS

EP-0913914-A1, Akemakou, all pages (Year: 1999).*
WO-2014016305-A2, Beckert, all pages (Year: 2014).*
JP-2016192879-A, Yamada, all pages (Year: 2016).*
CN-111509938-Bm Xu et all, all pages (Year: 2021).*

* cited by examiner

HYBRID INDUCTION MOTOR INCLUDING DUAL STATOR

CROSS-REFERENCE TO RELATED APPLICATIONS

This application is based on, and claims the benefit of priority to Korean Patent Application Number 10-2021-0092185, filed on Jul. 14, 2021 in the Korean Intellectual Property Office, the disclosure of which is incorporated by reference herein in its entirety.

TECHNICAL FIELD

The present disclosure in some embodiments relates to a hybrid induction motor including dual stators. More particularly, the present disclosure relates to a hybrid induction motor including dual stators for improving torque and output by arranging the dual stators inside and outside a hollow rotor.

BACKGROUND

The statements in this section merely provide background information related to the present disclosure and do not necessarily constitute prior art.

With the rise of vehicle electrification as a major issue in the automobile industry, the demand for rare-earth-free electric motors is increasing. Particular attention goes to induction motors as realistic rare-earth-free motors to replace permanent magnet synchronous motors (PMSMs) with research being actively carried out for improvements in torque-density, efficiency, and other performance objectives.

FIG. 1 is an exemplary partial cross-sectional view of a conventional induction motor including a single stator.

As shown in FIG. 1, the conventional induction motor includes a stator and a hollow rotor. The stator includes a stator core and stator windings, and the latter being disposed along an outer circumferential surface of a conductor bar. The hollow rotor includes, besides the conductor bar, a rotor core. The conductor bar is arranged in an annular form and spaced apart from a rotation axis by a predetermined distance.

With the single stator-type induction motor as shown in FIG. 1, the stator is disposed solely on the outside of the rotor and magnetic flux flows unilaterally into the conductor bar, which entails a limitation to the improvement of torque and output.

Meanwhile, for improving the output of an induction motor, there is a method of using a cooling system or a method of improving the fill factor of armature windings. When a cooling system is used to suppress the temperature rise of the armature windings, heat dissipation from the windings and the core causes the armature current and current density to increase, resulting in improvements in the armature magnetomotive force and the motor output. When improving the fill factor of armature windings, a decrease in armature resistance reduces the heat generation of the armature windings and increases the armature current under the same conditions of copper loss, thereby increasing the armature magnetomotive force and torque.

However, a method of forcefully reducing the heat generation of the armature windings leads to a limitation in improving the torque of the electric motor. There is a real need for providing a technology capable of advancing the arrangement of components included in the induction motor or improving the armature magnetomotive force based on control technology using an inverter.

The information disclosed in the Background section above is to aid in the understanding of the background of the present disclosure, and should not be taken as acknowledgement that this information forms any part of prior art.

SUMMARY

According to at least one embodiment, the present disclosure provides a hybrid induction motor including a hollow rotor including a single conductor bar which is annularly disposed and spaced apart from a rotation axis by a predetermined distance, an outer stator having an outer stator winding disposed in parallel with an outer circumferential surface of the hollow rotor, and an inner stator having an inner stator winding disposed in parallel with an inner circumferential surface of the hollow rotor.

Figure 1:
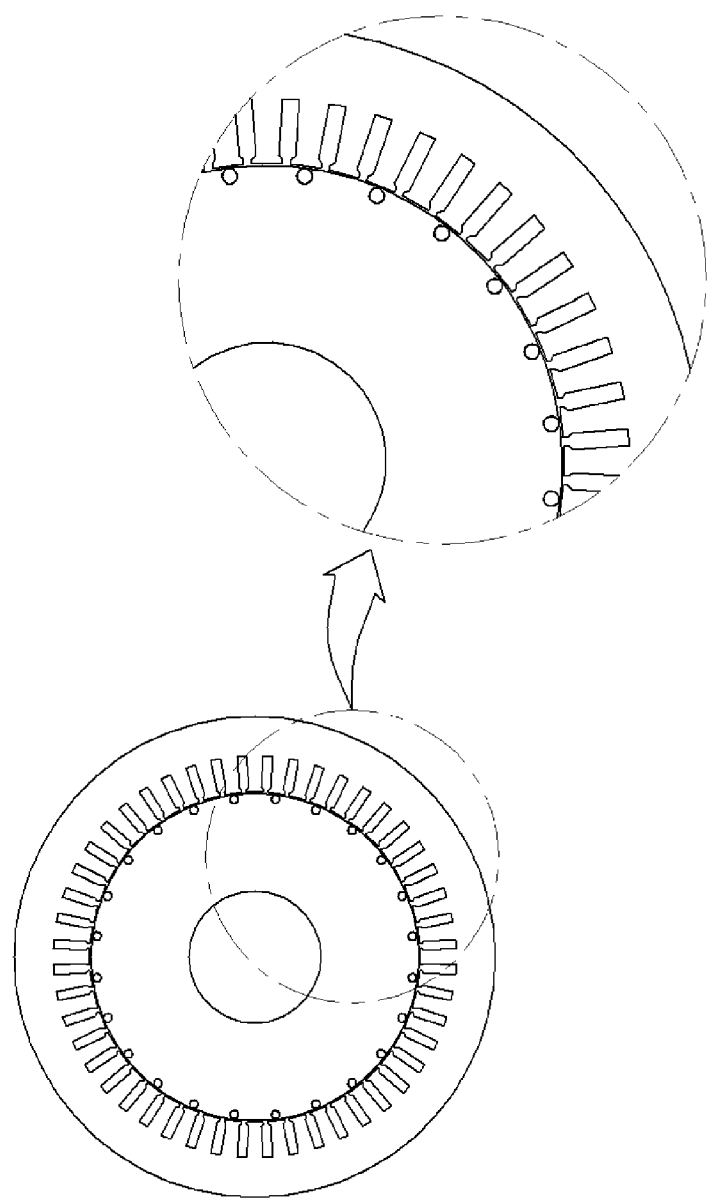
FIG. 1 is an exemplary partial cross-sectional view of a conventional induction motor including a single stator.

| REFERENCE NUMERALS | |
|---|---|
| 20, 30, 40, 50: hybrid induction motor | 200: rotor |
| 200_A: single conductor bar | 200_B: rotor core |
| 201: outer stator | 202: outer stator slot |
| 203: inner stator | 204: inner stator slot |
| 206: outer stator core | 208, 402, 504: inner stator core |
| 300_A: outer magnetic flux path | 300_B: inner magnetic flux path |
| 302: magnetic flux path | 400: inner stator slot |
| 500: single conductor bar | 502: inner stator slot |

DETAILED DESCRIPTION

The present disclosure in one aspect seeks to provide a hybrid induction motor with improved performance such as high torque density and high output density by an increased magnetic flux supply from the dual stators disposed on both sides of the rotor.

The present disclosure in another aspect of the present disclosure seeks to provide a hybrid induction motor with reduced harmonics and torque ripple by using phase shift control between the outer stator and the inner stator.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Techniques are being developed for improving the performance of induction motors, such as torque and power density. The present disclosure in some embodiments provides a superior hybrid induction motor over the conventional induction motor as illustrated in FIG. 1 by providing the induction motor components in distinctive arrangements for reducing torque ripples and harmonics.

More specifically, the present disclosure provides a hybrid induction motor unlike anything else with stators arranged inside and outside of a hollow rotor including a conductor bar disposed in a single row. Additionally, the present disclosure provides a hybrid induction motor including dual stators with improved performance such as high torque density and high output density by causing the electric current supplied to the inner stator winding(s) and the electric current supplied to the outer stator winding(s) to have a preset phase difference.

The detailed description set forth below in conjunction with the appended drawings is intended to describe illustrative embodiments of the present disclosure and is not meant to represent the only embodiments in which the present disclosure may be practiced.

Figure 2:
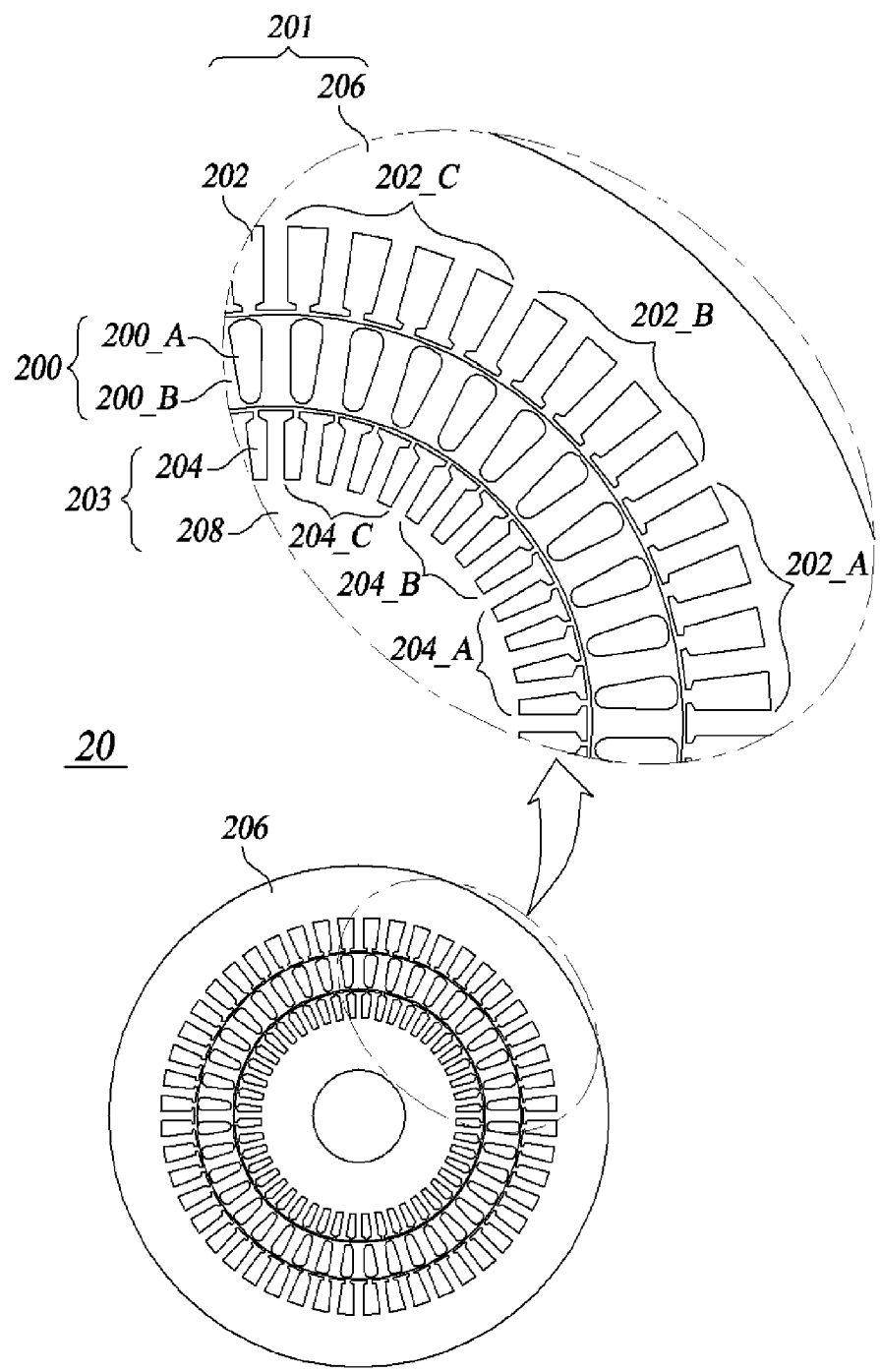
FIG. 2 is a partial cross-sectional view of a hybrid induction motor including dual stators according to at least one exemplary embodiment of the present disclosure.

FIG. 2 is a partial cross-sectional view of a hybrid induction motor 20 including dual stators according to at least one exemplary embodiment of the present disclosure.

As shown in FIG. 2, the embodiment provides the induction motor with a rotor 200 including a single conductor bar 200_A which is arranged annularly in a single row and spaced apart from a rotation axis of the induction motor 20 by a predetermined distance. The induction motor 20 has an outer stator 201 that includes an outer stator winding(s) (not shown) and an outer stator core 206 and is disposed along the outer circumferential surface of the single conductor bar 200_A. The outer stator winding may be inserted into the outer stator slot(s) 202 formed along the outer circumferential surface of the hollow rotor 200. The plurality of outer stator slots 202 may be formed parallel to the radial direction of the rotation axis with a constant width so that the outer stator windings are inserted. The induction motor 20 has an inner stator 203 that includes an inner stator winding(s) (not shown) and an inner stator core 208, and is disposed along the inner circumferential surface of the single conductor bar 200_A. The inner stator winding may be inserted into the inner stator slot(s) 204 formed along the inner circumferential surface of the hollow rotor 200. The plurality of inner stator slots 204 may be formed parallel to the radial direction of the rotation axis with a constant width so that the inner stator windings are inserted. Since the single conductor bar 200_A takes the magnetic flux from both sides thereof, such an induction motor of the single conductor bar type is superior in terms of torque and output over the conventional induction motor in which the stator is disposed solely on the outside of the rotor 200 and magnetic flux flows one-sidedly into the conductor bar. Additionally, in comparison with a conventional dual conductor bar-type induction motor, the present conductor bar 200_A is configured as a single conductor bar type with a rotor yoke removed from inside the rotor 200, thereby facilitating the manufacture thereof.

Figure 3A:
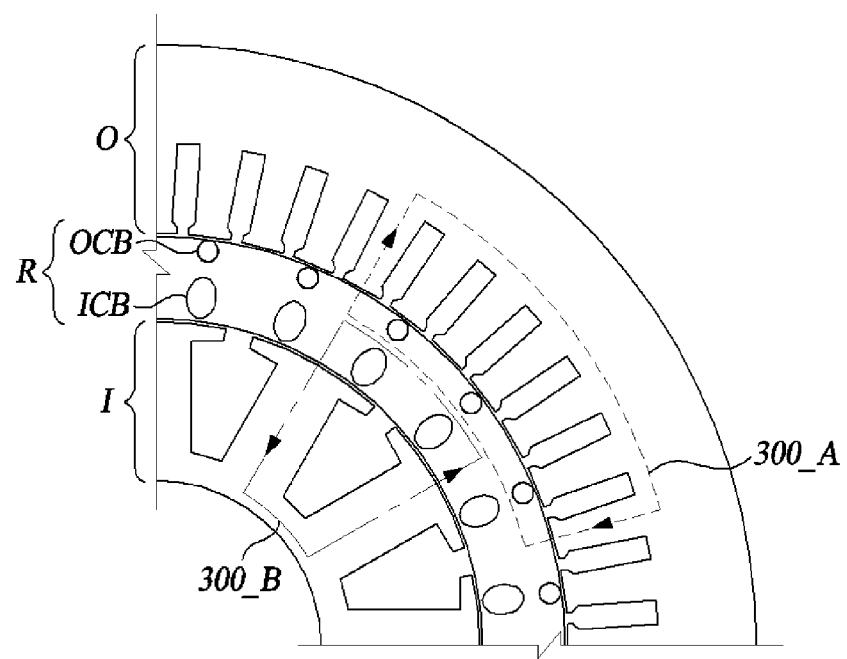
FIGS. 3A and 3B are exemplary partial cross-sectional views for comparing magnetic flux paths by the types of induction motors (FIG. 3A: a conventional type of an induction motor, FIG. 3B: an induction motor according to one exemplary embodiment of the present disclosure).
Figure 3B:
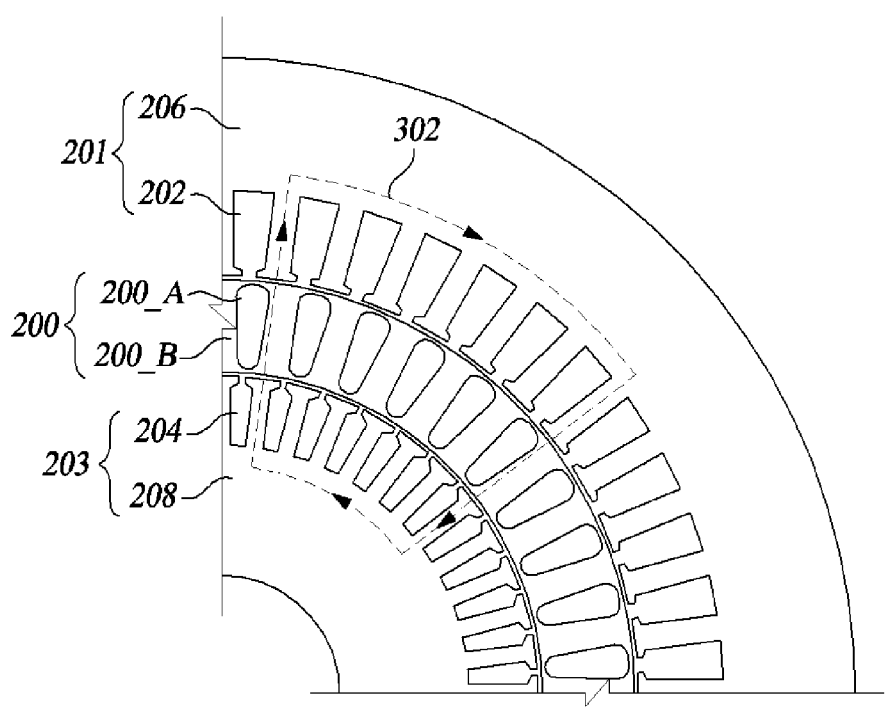

FIGS. 3A and 3B are exemplary partial cross-sectional views for comparing magnetic flux paths by the types of induction motors.

FIG. 3A illustrates a magnetic flux path 300_A and 300_B formed in an induction motor of a dual conductor bar type. As shown in FIG. 3A, the dual conductor bar-type induction motor includes a hollow rotor R, an outer stator O, and an inner stator I. The hollow rotor R includes an outer conductor bar OCB and an inner conductor bar ICB which are disposed to face the outer stator and the inner stator, respectively. The outer stator includes an outer stator winding and an outer stator core, and the inner stator includes an inner stator winding and an inner stator core.

Here, the conventional induction motor forms an outer magnetic flux path 300_A surrounding the outer stator winding and the outer conductor bar and an inner magnetic flux path 300_B surrounding the inner stator winding and the inner conductor bar. In particular, the presence of a rotor yoke between the outer conductor bar and the inner conductor bar of the rotor R will separate outer magnetic flux path 300_A from inner magnetic flux path 300_B by a magnetic flux shielding wall. This renders outer and inner magnetic flux paths 300_A and 300_B to each involve a section that passes through the rotor yoke, leading to an extended path of the magnetic flux passing through the rotor R. The longer the path of the magnetic flux passing through the rotor R, the less smooth torque is generated. As a result, the dual conductor bar-type induction motor as shown in FIG. 3A submits to performance limits in terms of torque and power density.

On the other hand, the present disclosure in at least one exemplary embodiment as shown in FIG. 3B provides the single conductor bar-type induction motor 30 with a magnetic flux path 302 sans a rotor yoke thereon, which renders the path of the magnetic flux passing through the rotor 200 to be formed relatively short and thereby allows torque to be briefly generated. Accordingly, the induction motor 30 of this embodiment overcomes the limitations of the conventional dual conductor bar-type induction motor shown in FIG. 3A to effect remarkably improved torque and/or power density.

The conventional induction motor shown in FIG. 3A involves the rotor yoke taking a large space in the induction motor since each magnetic flux path 300_A and 300_B passes through the rotor yoke. Whereas, the present induction motor 30 as in FIG. 3B takes a rotor yoke away from inside the rotor 200 to reduce the size of the rotor 200, allowing relatively large stators 201 and 203 to be arranged as compared to the conventional induction motor in FIG. 3A. This increases the area on which the armature magnetomotive force acts and thereby improves the torque density and/or output density of the induction motor 30.

Additionally, the outer stator winding and the inner stator winding according to the present embodiment are disposed separately with the hollow rotor 200 interposed therebetween so that the heat source is dispersed and thereby prevent the issue of heat from decreasing the efficiency of the hybrid induction motor 20.

On the other hand, as shown in FIG. 2, the outer stator winding is disposed along the outer circumferential surface of the hollow rotor 200 to be supplied with an electric current at different phases of phase A at 202_A, phase B at 202_B, and phase C at 202_C. Additionally, the inner stator winding is disposed along the inner circumferential surface of the hollow rotor 200 to be supplied with an electric current at different phases of phase A' at 204_A, phase B' at 204_B, and phase C' at 204_C. Here, the outer stator winding and the inner stator winding may be energized by a single inverter or may be energized by separate inverters, respectively.

In at least one embodiment, when the outer stator winding and the inner stator winding are energized by a single inverter, they are supplied with currents having the same phase since the outer stator winding and the inner stator winding are disposed to face each other with the single conductor bar 200_A interposed therebetween. This improves the torque and/or the power density since the magnetic flux is supplied from the outside and the inside of the rotor including the single conductor bar 200_A.

In another embodiment where the outer stator winding and the inner stator winding are energized by separate inverters, respectively, the respective inverters may perform an electrical phase control for imparting at least one phase difference between the currents supplied to the outer stator winding and the inner stator winding. Accordingly, the embodiment obviates the need for a change in the physical winding arrangement to provide a phase difference between the armature magnetomotive forces generated from the currents flowing on the outer stator winding and the inner stator winding, thereby reducing torque ripples and harmonics due to induced voltage. Furthermore, improvements are provided in the vibration and noise characteristics of the induction motor thanks to the torque ripple and harmonic reduction.

Further, with separate inverters used for individually controlling the outer stator winding and the inner stator winding, the present disclosure enables active and efficient operations of the induction motor for each of various operating regions with different load conditions according to the present disclosure.

In at least one embodiment where the present induction motor operates in a high-load operating region, an outer inverter and an inner inverter may be provided to operate together so that the outer inverter controls the outer stator winding and the inner inverter controls the inner stator winding. Accordingly, since magnetic flux flows from the inside and outside of the hollow rotor 200, the hybrid induction motor 20 of the present disclosure can exhibit increases of torque density and/or output density. Here, the high-load operation region means a condition in which the hybrid induction motor 20 according to the present disclosure needs to output an output exceeding a preset threshold.

In at least one embodiment where the induction motor operates in a low-load operating region, the external inverter or the internal inverter may alternatively operate. Accordingly, magnetic flux flows into the hollow rotor 200 from just one of the outer stator winding and the inner stator winding to enable low load operations by efficiently using electric power. Here, the low-load operation region means a condition in which the hybrid induction motor 20 according to the present disclosure needs to produce an output equal to or less than a preset threshold.

In an additional embodiment where motor control modeling is employed for monitoring a rotational state such as RPM of the rotor, the stators can be actively controlled. For example, with just one outer stator winding being energized between the outer stator winding and the inner stator winding, when the monitored rotor RPM is lower than the target RPM, current may be supplied to the other stator winding for allowing the other relevant stator to be utilized as an auxiliary control means. Similarly, with both the outer stator winding and the inner stator winding being energized, when the monitored rotor RPM is significantly higher than the target RPM, the operation of one part stator may be stopped to prevent overload of the hybrid induction motor 20 of this embodiment. Here, the target RPM means the target output of the hybrid induction motor 20 according to the present disclosure.

On the other hand, it can be assumed that a failure occurs in any one of the separate inverters that control the outer and inner stator windings, respectively. If the stator windings were arranged on only one side of the rotor, the induction motor becomes inoperable when a failure occurs in the inverter controlling the stator windings. However, the hybrid induction motor 20 according to the present disclosure secures redundancy to cope with an outbreak, even when any one of the inverters fails, thanks to the other inverter operating independently to drive the induction motor.

Figure 4:
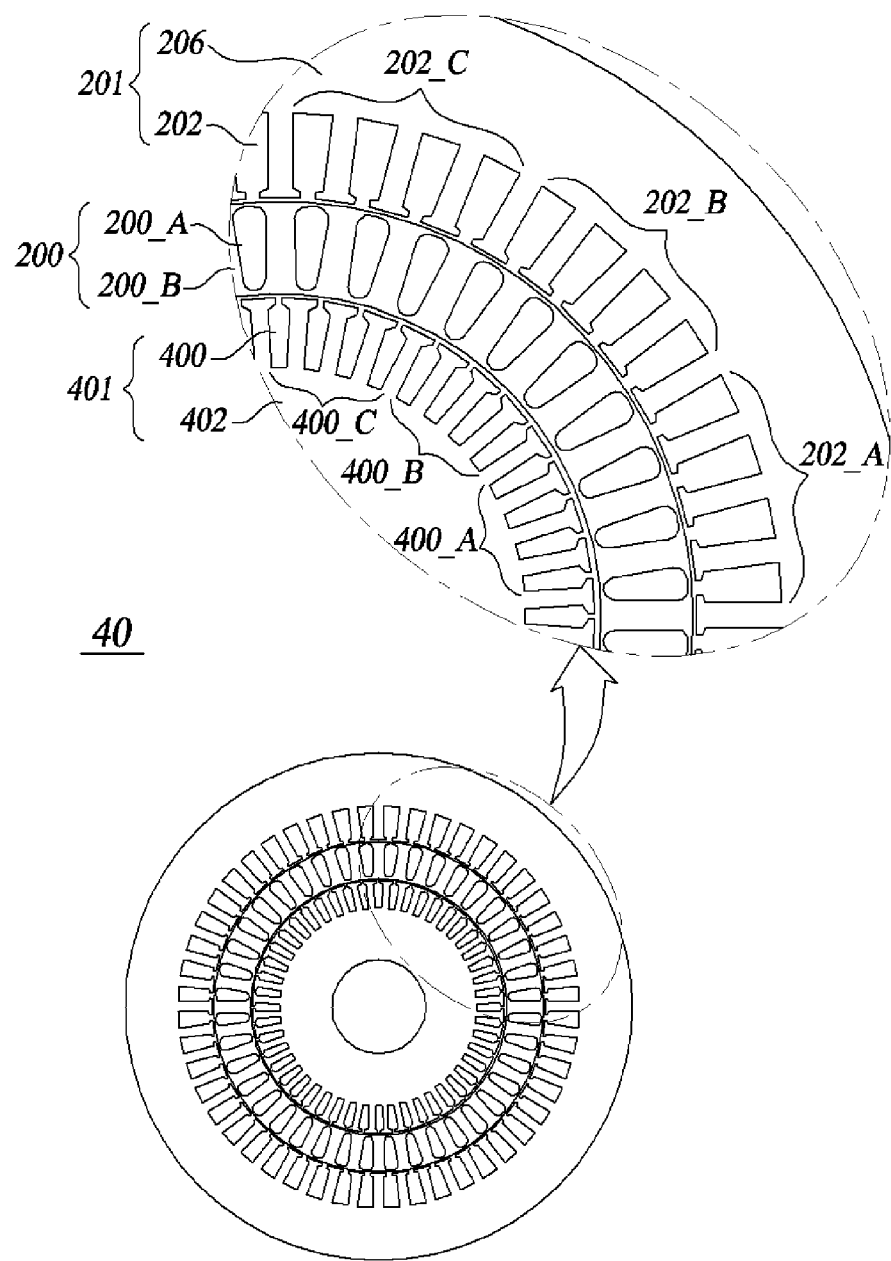
FIG. 4 is a partial cross-sectional view of a hybrid induction motor according to another exemplary embodiment with a modification in the physical arrangement of an inner stator winding and an outer stator winding.

FIG. 4 is a partial cross-sectional view of a hybrid induction motor 40 according to another exemplary embodiment with a modification in the physical arrangement of an outer stator winding and an inner stator winding.

As shown in FIG. 4, the hybrid induction motor 40 has a hollow rotor and an outer stator winding disposed along the outer circumferential surface of the hollow rotor to be supplied with an electric current at different phases of phase A at 202_A, phase B at 202_B, and phase C at 202_C. Further, the hybrid induction motor 40 has an inner stator winding disposed along the inner circumferential surface of the hollow rotor to be supplied with an electric current at different phases of phase A' at 400_A, phase B' at 400_B, and phase C' at 400_C. Here, the present hybrid induction motor 40 has outer stator slot(s) 202 and inner stator slot(s) 400 for holding the outer stator winding and the inner stator winding 400, respectively, wherein, unlike the hybrid induction motor 20 in FIG. 2, the outer stator slot(s) 202 are shifted from the inner stator slot(s) 400 by a preset slot pitch. This generates at least one phase difference between the current supplied to the outer stator winding and the current supplied to the inner stator winding. Therefore, the hybrid induction motor 40 with a modified physical arrangement of the windings as shown in FIG. 4 provides the phase difference between the armature magnetomotive forces generated from the currents flowing on the outer stator winding and the inner stator winding, thereby reducing torque ripples and harmonics due to induced voltage.

Further, embodiments of the present disclosure envision different variations of a method of forming the stator slots 202 and 400 to provide a phase difference in the currents supplied to the outer stator winding and the inner stator winding. For example, a preset slot pitch may be any one of, but is not limited to, 0.5-slot pitch, 1-slot pitch, 2-slot pitch, and 3-slot pitch.

Figure 5:
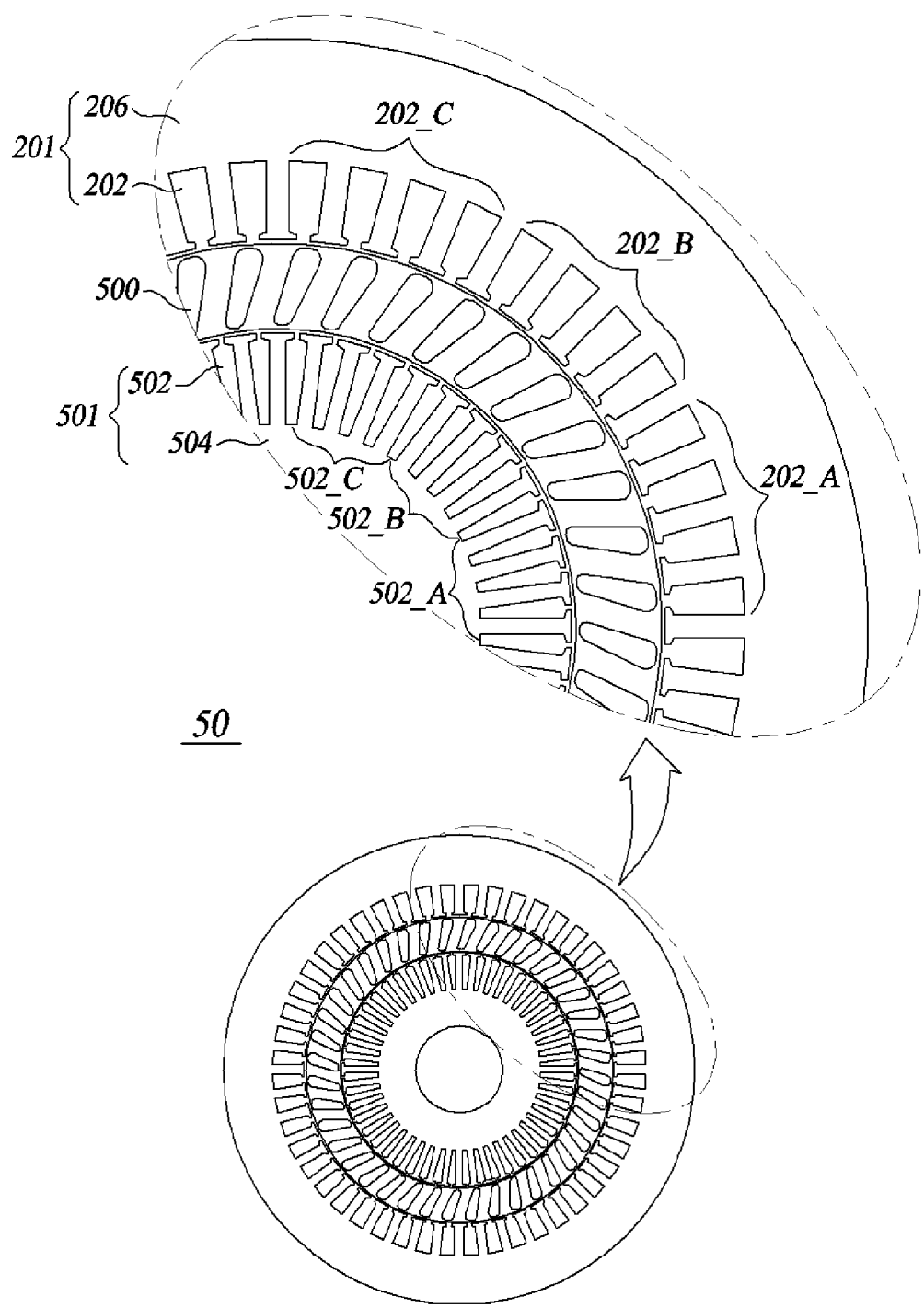
FIG. 5 is a partial cross-sectional view of a hybrid induction motor according to yet another exemplary embodiment wherein a single conductor bar forms a skew with dual stators.

FIG. 5 is a partial cross-sectional view of a hybrid induction motor 50 according to yet another exemplary embodiment wherein a single conductor bar forms a skew with dual stators.

Different from the hybrid induction motor 40 according to another embodiment of FIG. 4 wherein the single conductor bar is disposed parallel to the outer and inner stators, the hybrid induction motor 50 of FIG. 5 has a single conductor bar 500, an outer stator 201, an inner stator 501, an outer stator winding inserted into the outer stator slot(s) 202, and inner stator winding inserted into the inner stator slot(s) 502 wherein the single conductor bar 500 is skewed by a preset angle with respect to the outer stator 201 that includes an outer stator winding and an outer stator core 206 and the inner stator 501 that includes an inner stator winding and an inner stator core 504. The single conductor bar 500 as disposed in this way to form the skew can increase the average torque and reduces the torque ripples.

In yet another embodiment where the skewed arrangement of the single conductor bar 500 is combined with separate inverters used for the controlled generation of a phase difference between the currents supplied to the outer stator winding and the inner stator winding, the torque ripples can be further reduced.

In yet another embodiment where the skewed arrangement of the single conductor bar 500 is combined with such modified physical arrangement of the windings as shown in FIG. 4 for providing a phase difference between the currents supplied to the outer stator winding and the inner stator winding, the torque ripples can be further reduced.

Figure 6A:
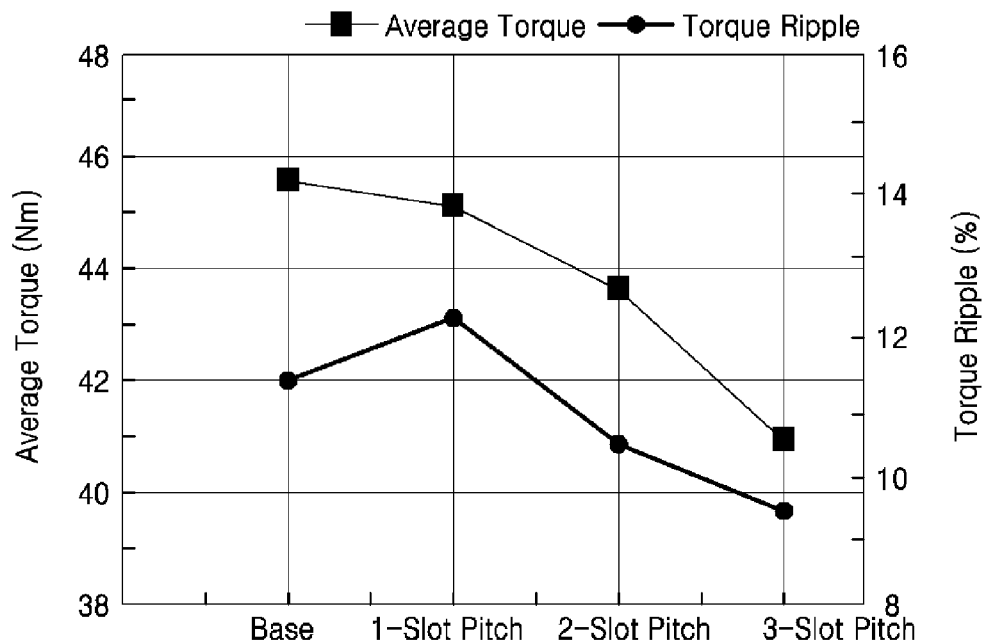
FIGS. 6A and 6B are simulation graphs showing torque ripple reductions of hybrid induction motors according to some exemplary embodiments of the present disclosure.
Figure 6B:
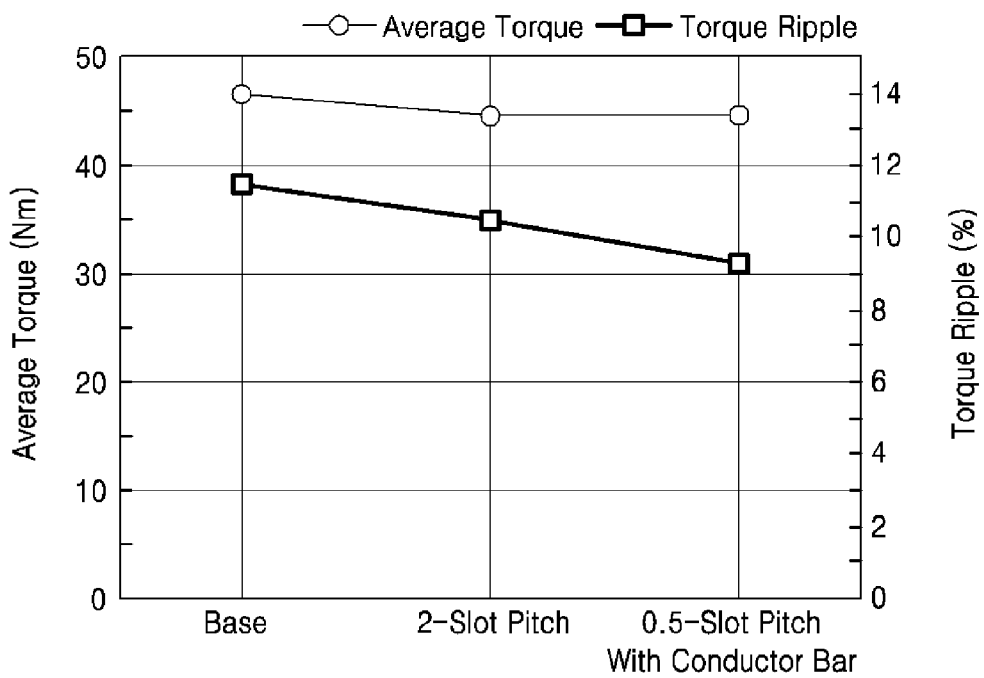

FIGS. 6A and 6B are simulation graphs showing torque ripple reductions of hybrid induction motors according to some exemplary embodiments of the present disclosure.

As shown in FIG. 6A, when separate inverters are used to have a controlled phase difference between the currents supplied to the outer stator 202/206 and the inner stator 204/208, the effect of reducing torque ripples is graphically eminent. When controlling to provide phase differences as much as preset slot pitches, the average torque and torque ripple are reduced compared to the base hybrid induction motor 20 shown in FIG. 2. Accordingly, the phase difference between the currents supplied to the stators 201/203 may be varied according to the environment in which the hybrid induction motor is driven according to the embodiments of the present disclosure.

As graphically shown in FIG. 6B, when separate inverters are used to control the currents supplied to the outer stator 201 and the inner stator 203 to have a phase difference corresponding to 2-slot pitches, the average torque maintains while reducing the torque ripples compared to the basic hybrid induction motor 20 according to the embodiment of FIG. 2. The graph also shows that the average torque maintains while reducing the torque ripples by about 10% or more by using the configurations as illustrated in FIG. 5 wherein the single conductor bar 500 is arranged to form a skew with the currents supplied to the stators controlled to have a phase difference therebetween.

The present disclosure in at least one embodiment can improve the performance of torque density, output density, etc. thanks to an increase in armature magnetomotive force by dually disposed stators on both sides of the rotor with no need to change the overall volume of the electric motor.

The present disclosure in another embodiment of the present disclosure can use a hollow rotor including a conductor bar disposed in a single row for shortening a magnetic flux path to improve the torque of the induction motor.

The present disclosure in yet another embodiment of the present disclosure can use the stators in a distributed arrangement for dispersing the heat generated due to the armature copper loss to prevent overheating of the induction motor.

The present disclosure in yet another embodiment of the present disclosure can utilize a plurality of inverters for individually controlling the stators in a distributed arrangement, thereby providing variable control of the electric motor for each of various operating regions of the motor.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An induction motor, comprising:
a hollow rotor including a plurality of conductor bars which are annularly disposed and spaced apart from a rotation axis by a predetermined distance;
an outer stator having an outer stator winding disposed in parallel with an outer circumferential surface of the hollow rotor; and
an inner stator having an inner stator winding disposed in parallel with an inner circumferential surface of the hollow rotor without a permanent magnet,
wherein each of the plurality of conductor bars is arranged in a single row extending in a direction from a radial inner side to a radial outer side of the hollow rotor.

2. The induction motor of claim 1, wherein the outer stator and the inner stator are supplied with an electric current from a single inverter.

3. The induction motor of claim 1, wherein the outer stator and the inner stator are supplied with electric currents from different inverters.

4. The induction motor of claim 3, wherein the different inverters include an outer inverter configured to supply an electric current to the outer stator and an inner inverter configured to supply an electric current to the inner stator, and
the outer stator and the inner stator are supplied with electric currents from the outer inverter and the inner inverter, respectively.

5. The induction motor of claim 3, wherein the different inverters include an outer inverter configured to supply an electric current to the outer stator and an inner inverter configured to supply an electric current to the inner stator, and
the outer stator or the inner stator is selectively supplied with the electric current from the outer inverter or the inner inverter.

6. The induction motor of claim 3, wherein the different inverters include an outer inverter configured to supply an electric current to the outer stator and an inner inverter configured to supply an electric current to the inner stator, and
the different inverters are configured to control the electric current that is supplied to the outer stator winding and the electric current that is supplied to the inner stator winding separately so that at least one preset phase difference exists between two electric currents supplied to the outer stator winding and the inner stator winding, respectively.

7. The induction motor of claim 1, wherein the outer stator and the inner stator have outer stator slots and inner stator slots configured to accommodate the outer stator winding and the inner stator winding, respectively, the outer stator slots being disposed to be shifted from the inner stator slots by a preset slot pitch.

8. The induction motor of claim 1, wherein the plurality of conductor bars are skewed by a preset angle with respect to the outer stator and the inner stator.

* * * * *